G. P. BUTLER.
SCREWDRIVER.
APPLICATION FILED AUG. 13, 1920.
1,391,242. Patented Sept. 20, 1921.
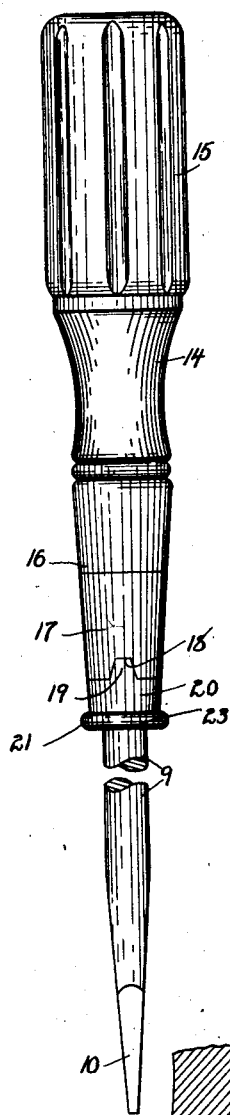
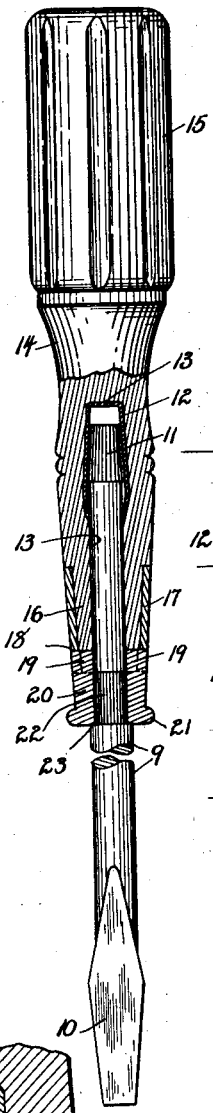
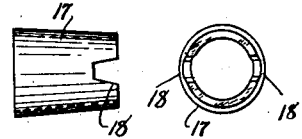
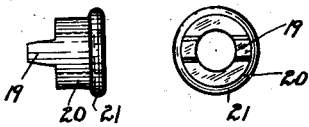
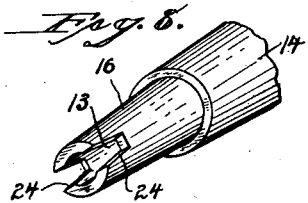
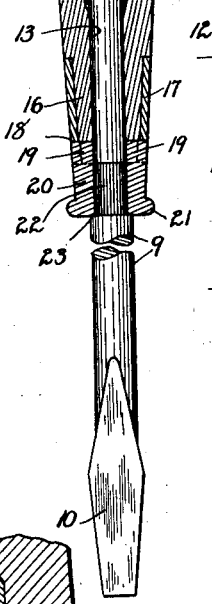
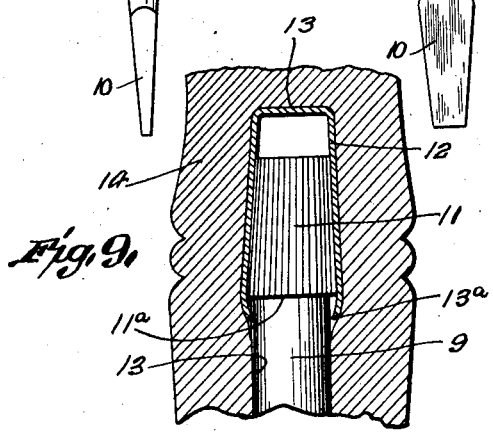

UNITED STATES PATENT OFFICE.

GEORGE P. BUTLER, OF NEW HAVEN, CONNECTICUT, ASSIGNOR TO WINCHESTER REPEATING ARMS CO., OF NEW HAVEN, CONNECTICUT, A CORPORATION.

SCREWDRIVER.

1,391,242.      Specification of Letters Patent.    Patented Sept. 20, 1921.

Application filed August 13, 1920. Serial No. 403,215.

*To all whom it may concern:*

Be it known that I, GEORGE P. BUTLER, a citizen of the United States, residing at New Haven, in the county of New Haven and State of Connecticut, have invented a new and useful Improvement in Screwdrivers; and I do hereby declare the following, when taken in connection with the accompanying drawings and the characters of reference marked thereon, to be a full, clear, and exact description of the same, and which said drawings constitute part of this application, and represent, in—

Figure 1, a view in elevation of a screw-driver constructed in accordance with my invention, a portion of the shank being broken away.

Fig. 2, a corresponding view with the central portion of the driver shown in central longitudinal section.

Fig. 3, a detached view in side elevation of the ferrule.

Fig. 4, an end view thereof.

Fig. 5, a detached view in side elevation of the bolster.

Fig. 6, an end view thereof.

Fig. 7, a detached view in side elevation of the expansible shank-retaining cup.

Fig. 8, a broken perspective view of the notched tenon at the inner end of the handle.

Fig. 9, a broken enlarged view with the handle and retaining-cup in longitudinal section and the tool-shank and its retaining-head in side elevation.

My invention relates to an improved screw-driver, the object being to produce a strong, convenient, effective and durable driver of the type having a handle of circular cross-section.

With these ends in view my invention consists in a screw-driver having certain details of construction and combination of parts as will be hereinafter described and pointed out in the claim.

In carrying out my invention as herein shown, the shank 9 of the driver is formed at its outer end with a blade 10 and at its inner end with an integral slightly tapered serrated retaining-head 11 separated from the body of the shank by an annular shoulder $11^a$ designed to be jammed into a slightly tapered sheet-metal retaining-cup 12 located in the bottom of the longitudinal bore 13 formed in the wooden handle 14 for the reception of the inner portion of the shank 9. When the said head 11 is driven into the cup 12 its serrations embed themselves therein while the cup is itself expanded with the effect of having its side-walls embedded in the adjacent portions of the wood of the handle to produce an annular shoulder $13^a$, whereby the shank is in effect locked into the cup and the cup in turn embedded into and locked into the handle itself by the co-action of the said shoulders $11^a$ and $13^a$. It will be noticed by reference to Fig. 9, that the open edge of the cup is, by the elasticity of the wood of the handle, forced inwardly over the shoulder $11^a$, so as to contract the open end of the cup, whereby the head of the shank is locked into the cup, thus preventing any substantial longitudinal movement between the shank and the cup, which, in turn, is held against any substantial longitudinal movement in the bottom of the bore of the handle by the shoulder $13^a$ in the handle.

The handle 14 which is formed with a fluted grip 15 of circular cross-section, is formed at its inner end with a tapered tenon 16 over which is driven a conical ferrule 17 the lower edge of which is formed with two oppositely located locking-notches 18 receiving corresponding locking-lugs 19 formed upon the upper end of a bolster 20 having a bead 21 upon its lower end and driven upon a band of serrations 22 formed upon the shank and terminating at their lower ends in a positioning-shoulder 23 formed upon the shank to provide an abutment for the bolster. The lugs 19 not only enter the said notches 18 in the ferrule 17 but also enter corresponding notches 24 in the lower end of the tenon 16 of the handle 14, whereby the handle and the ferrule are held against rotation with respect to the bolster and the bolster held against rotation with respect to the shank, by means of the serrations 22 thereof.

I claim:

A screw-driver having a wooden handle formed with a transversely-notched tapering tenon and with a central longitudinal shank-receiving bore, a correspondingly transversely-notched ferrule encircling the said tenon, a bolster applied to the shank and provided with locking-lugs entering the transverse notches in the said tenon, an expansible shank-retaining cup located in the bottom of the said bore, and a shank having at its inner end a tapering head separated from the body of the shank by an annular shoulder, whereby the said handle, bolster and shank are held against rotation and whereby the head of the shank expands the cup and embeds the outer end thereof into the side walls of the said bore in the handle so as to hold the cup against longitudinal displacement in the bore and the head against longitudinal displacement in the cup.

In testimony whereof, I have signed this specification in the presence of two subscribing witnesses.

GEORGE P. BUTLER.

Witnesses:
ERIK S. PALMER,
A. E. HODGSON.